United States Patent
Kuan et al.

(10) Patent No.: US 9,065,334 B2
(45) Date of Patent: Jun. 23, 2015

(54) VOLTAGE CONVERTER HAVING AUXILIARY SWITCH IMPLEMENTED THEREIN AND RELATED VOLTAGE CONVERTING METHOD THEREOF

(75) Inventors: Chien-Wei Kuan, Hsinchu (TW); Yen-Hsun Hsu, Hsinchu County (TW)

(73) Assignee: MEDIATEK INC., Science-Based Industrial Park, Hsin-Chu (TW)

( * ) Notice: Subject to any disclaimer, the term of this patent is extended or adjusted under 35 U.S.C. 154(b) by 245 days.

(21) Appl. No.: 13/170,168

(22) Filed: Jun. 27, 2011

(65) Prior Publication Data

US 2012/0326691 A1 Dec. 27, 2012

(51) Int. Cl.
G05F 1/577 (2006.01)
H02M 3/158 (2006.01)
H02M 1/00 (2007.01)

(52) U.S. Cl.
CPC ........ H02M 3/158 (2013.01); *H02M 2001/009* (2013.01)

(58) Field of Classification Search
CPC ..... H02M 3/155; H02M 3/156; H02M 3/158; H02M 3/33561; H02M 2001/009
USPC ............... 323/267, 268, 271, 299; 307/11–42
See application file for complete search history.

(56) References Cited

U.S. PATENT DOCUMENTS

| | | | |
|---|---|---|---|
| 7,061,214 B2 * | 6/2006 | Mayega et al. | 323/267 |
| 7,256,568 B2 * | 8/2007 | Lam et al. | 323/222 |
| 7,432,614 B2 * | 10/2008 | Ma et al. | 307/31 |
| 2004/0135562 A1 | 7/2004 | Oden | |
| 2004/0201281 A1 * | 10/2004 | Ma et al. | 307/38 |
| 2005/0110471 A1 * | 5/2005 | Mayega et al. | 323/267 |
| 2005/0264271 A1 | 12/2005 | Lam | |
| 2008/0231115 A1 * | 9/2008 | Cho et al. | 307/41 |
| 2010/0194359 A1 * | 8/2010 | Notman | 323/267 |
| 2011/0043181 A1 * | 2/2011 | Jing et al. | 323/288 |

FOREIGN PATENT DOCUMENTS

| | | | | |
|---|---|---|---|---|
| GB | 2451470 A | * | 2/2009 | ............ H02M 3/158 |
| WO | 02060043 A1 | | 8/2002 | |

OTHER PUBLICATIONS

Belloni, "On the Design of Single-Inductor Multiple-Output DC-DC Buck Converters", pp. 3049-3052, IEEE International Symposium on Circuits and Systems, 2008.

* cited by examiner

*Primary Examiner* — Timothy J Dole
*Assistant Examiner* — Ivan Laboy Andino
(74) *Attorney, Agent, or Firm* — Winston Hsu; Scott Margo

(57) ABSTRACT

A voltage converter has an input terminal and only N output terminals, and includes a DC-DC power supply block having an input node and an output node, (N+1) switches including N main output switches and an auxiliary switch each having a first end and a second end, and a switch control circuit. The DC-DC power supply block includes an inductor, and a switch module configured for alternating between a first interconnection configuration and a second interconnection configuration during a predetermined time period. First ends of the (N+1) switches are coupled to the output node, and second ends of the N main output switches are coupled to the N output terminals, respectively. The switch control circuit is configured for controlling the switch module and the (N+1) switches, wherein the (N+1) switches are switched on alternately during the predetermined time period.

24 Claims, 11 Drawing Sheets

US 9,065,334 B2

VOLTAGE CONVERTER HAVING AUXILIARY SWITCH IMPLEMENTED THEREIN AND RELATED VOLTAGE CONVERTING METHOD THEREOF

BACKGROUND

The disclosed embodiments of the present invention relate to generating regulated output voltages, and more particularly, to a voltage converter having an auxiliary switch implemented therein and related voltage converting method thereof.

The DC/DC switching converter is an indispensable part of many power management systems. As all designs are put into an effort of size reduction, the voltage converter cannot stay out of that trend. Designers, therefore, are exploring the way to shrink the size in both on-chip and off-chip implementation. Of all the approaches, single-inductor multiple-output (SIMO) converters come to prevail. With only one single inductor to regulate more than one output voltage, the implementation can avoid problems that happen in conventional types of voltage converters, such as too many bulky power devices including inductors, capacitors, and control chips. Hence, the cost of mass-production is obviously much reduced. The SIMO design shows up as a most suitable and cost-effective solution in future development of DC-DC converter.

Many control schemes are proposed for SIMO converters based on buck topologies. For example, the control schemes may include a control scheme in a voltage mode, a control scheme in a current mode, a control scheme in a discontinuous conduction mode (DCM), and a control scheme in a pseudo continuous conduction mode (CCM). However, it is still a big challenge to DC-DC converter designers because an undesired phenomenon occurs when a load transient on any of converter outputs affects the voltage regulation of other converter outputs. From the efficiency's point of view, the control scheme in CCM is more attractive, and some CCM-based solutions for the SIMO converters have been proposed. The CCM-based solution, however, always encounters cross regulation between the different regulated output voltages of the SIMO converter.

The drawbacks of the conventional techniques, therefore, urge the development of a new control method for SIMO converters.

SUMMARY

In accordance with exemplary embodiments of the present invention, a voltage converter having an auxiliary switch implemented therein and related voltage converting method thereof are proposed to solve the above-mentioned cross regulation problem.

According to a first aspect of the present invention, an exemplary voltage converter having an input terminal for receiving a reference input voltage and only N output terminals for outputting regulated output voltages is disclosed. The exemplary voltage converter includes a DC-DC power supply block and (N+1) switches. The DC-DC power supply block has an input node and an output node, and is configured for storing energy through the input node coupled to the input terminal and discharging the stored energy through the output node. The (N+1) switches include N main output switches and an auxiliary switch each having a first end and a second end. First ends of the (N+1) switches are coupled to the output node, and second ends of the N main output switches are coupled to the N output terminals, respectively, where N is a positive integer. The (N+1) switches are switched on alternately during a predetermined time period.

According to a second aspect of the present invention, an exemplary voltage converting method is disclosed. The exemplary voltage converting method includes providing a voltage converter having an input terminal for receiving a reference input voltage and only N output terminals for outputting regulated output voltages. The voltage converter includes a DC-DC power supply block having an input node and an output node, and N main output switches each having a first end and a second end. The DC-DC power supply block stores energy through the input node coupled to the input terminal and discharges the stored energy through the output node. First ends of the N main output switches are coupled to the output node, and second ends of the main N output switches are coupled to the N output terminals, respectively, where N is a positive integer. The exemplary voltage converting method further includes: providing an auxiliary switch having a first end and a second end; coupling the first end of the auxiliary switch to the output node; and during a predetermined time period, switching on the N main output switches and the auxiliary switch alternately.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the description and following claims to refer to particular components. As one skilled in the art will appreciate, manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is electrically connected to another device, that connection may be through a direct electrical connection, or through an indirect electrical connection via other devices and connections.

The main conception of the present invention is to add an auxiliary switch to a voltage converter (e.g., a SIMO converter). In this way, the output voltages supplied from output terminals of the voltage converter to load devices are properly regulated due to controllable non-overlapped duty cycles of respective main output switches that are alternately switched on during one predetermined time period. To put it another way, the cross regulation issue is solved as the auxiliary switch which is not used for controlling the output voltage allows duty cycles of main output switches that are used for controlling the output voltages to be well controlled. Further details are described as follows.

Figure 1:
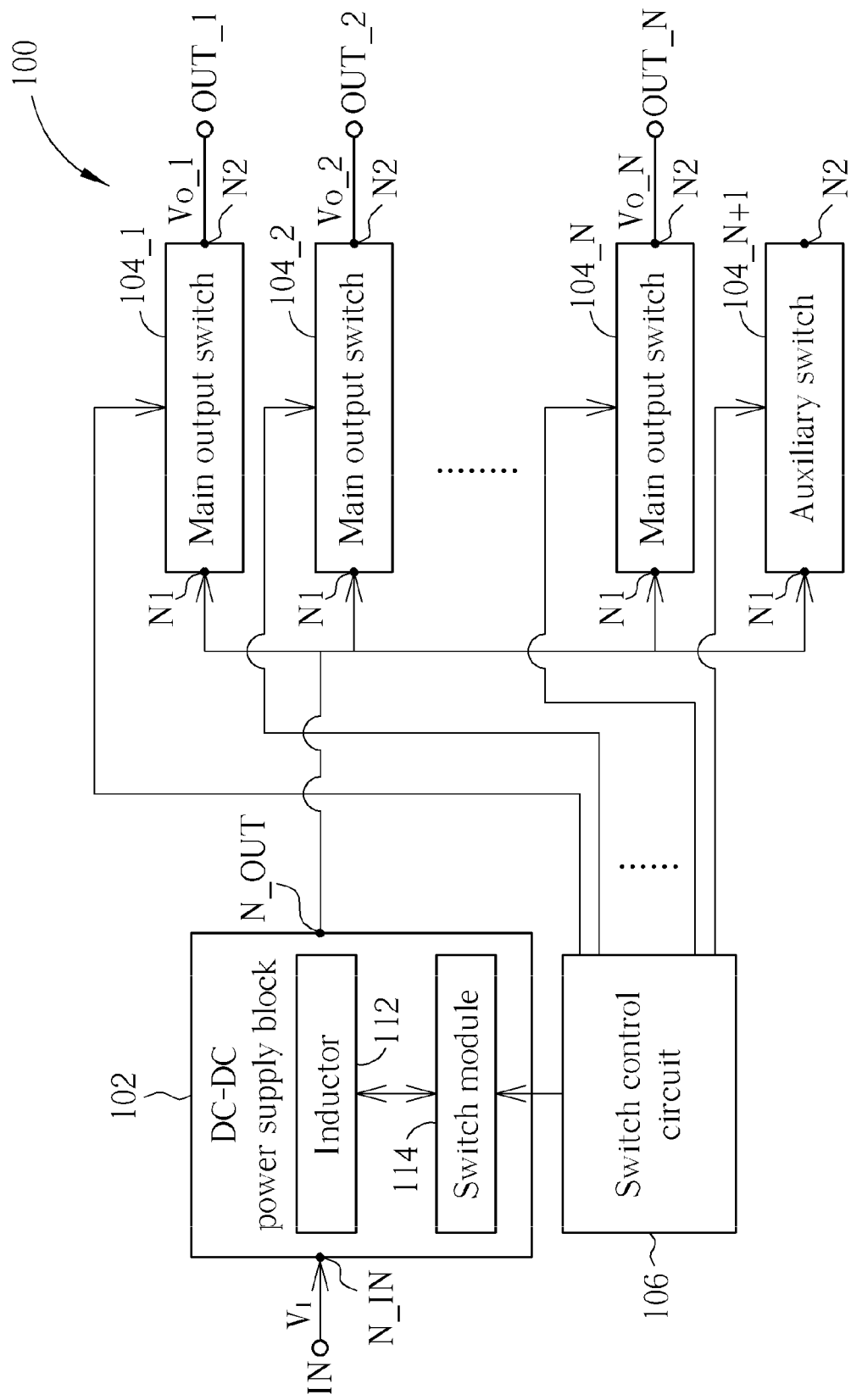
FIG. 1 is a block diagram illustrating a generalized voltage converter according to an exemplary embodiment of the present invention.

FIG. 1 is a block diagram illustrating a generalized voltage converter according to an exemplary embodiment of the present invention. The exemplary voltage converter 100 has one input terminal IN and a plurality of output terminals OUT_1, OUT_2, . . . , OUT_N. By way of example, but not limitation, the voltage converter 100 is configured to operate in CCM. The input terminal IN may be coupled to a voltage source (not shown) which supplies a reference input voltage $V_1$, and the output terminals OUT_1-OUT_N are respectively coupled to load devices (not shown) for outputting regulated output voltages $V_O\_1, V_O\_2, \ldots, V_O\_N$ acting as supply voltages needed by load devices. As shown in FIG. 1, the voltage converter 100 includes, but is not limited to, a DC-DC power supply block 102, a plurality of output switches including main output switches 104_1, 104_2, . . . , 104_N and an auxiliary switch 104_N+1, and a switch control circuit 106. The DC-DC power supply block 102 has an input node N_IN and an output node N_OUT, and includes an inductor 112 and a switch module 114. Regarding the inductor 112, it is configured for storing energy through the input node N_IN coupled to the input terminal IN and discharging the stored energy through the output node N_OUT. Regarding the switch module 114, it is coupled to the inductor 112 and configured for alternating between at least a first interconnection configuration and a second interconnection configuration during a predetermined time period.

Each of the (N+1) switches, including N main output switches 104_1-104_N and one auxiliary switch 104_N+1, has a first end N1 and a second end N2, wherein first ends N1 of all of the (N+1) switches 104_1-104_N+1 are coupled to the output node N_OUT of the preceding DC-DC power supply block 102, and second ends N2 of the N main output switches 104_1-104_N are coupled to the N output terminals OUT_1-OUT_N, respectively. Please note that the value of N mentioned above is a positive integer.

The switch control circuit 106 is configured for controlling the switch module 114 and the (N+1) switches 104_1-104_N+1, wherein the (N+1) switches 104_1-104_N+1 are switched on alternately during the predetermined time period in which the switch module 114 alternates between the first interconnection configuration and the second interconnection configuration. Please note that the voltage converter 100 only has N output terminals OUT_1-OUT_N, and the number of implemented switches (i.e., 104_1-104_N+1) is N+1. To put it simply, the voltage converter 100 functions as a SIMO converter as one inductor 112 is employed and multiple regulated output voltages $V_O\_1$-$V_O\_N$ are generated.

With the use of the auxiliary switch 104_N+1, the non-overlapped duty cycles of the main output switches 104_1-104_N may be directly controlled by the switch control circuit 106, thereby solving the cross regulation issue encountered by the conventional SIMO converter. More specifically, in regard to the conventional SIMO converter, the duty cycle of the last output switch which controls and delivers the last regulated output voltage is directly set by one minus the sum of the controllable duty cycles of other output switches which controls and delivers regulated output voltages before the last output switch is switched on. In other words, the duty cycle of the last output switch is passively determined after duty cycles of other output switches are determined. Thus, the regulation of other output voltages would affect the regulation of the last output voltage. As a result, the last output voltage may fail to be properly adjusted to a target voltage value required by a corresponding load device. However, in regard to the exemplary SIMO converter (i.e., the voltage converter 100) proposed by the present invention, all of the duty cycles of the main output switches 104_1-104_N used for controlling and delivering regulated output voltages $V_O\_1$-$V_O\_N$ are well controlled. In this way, each of the output voltages $V_O\_1$-$V_O\_N$ would be properly regulated to reach a target voltage value required by a corresponding load device.

Figure 2:
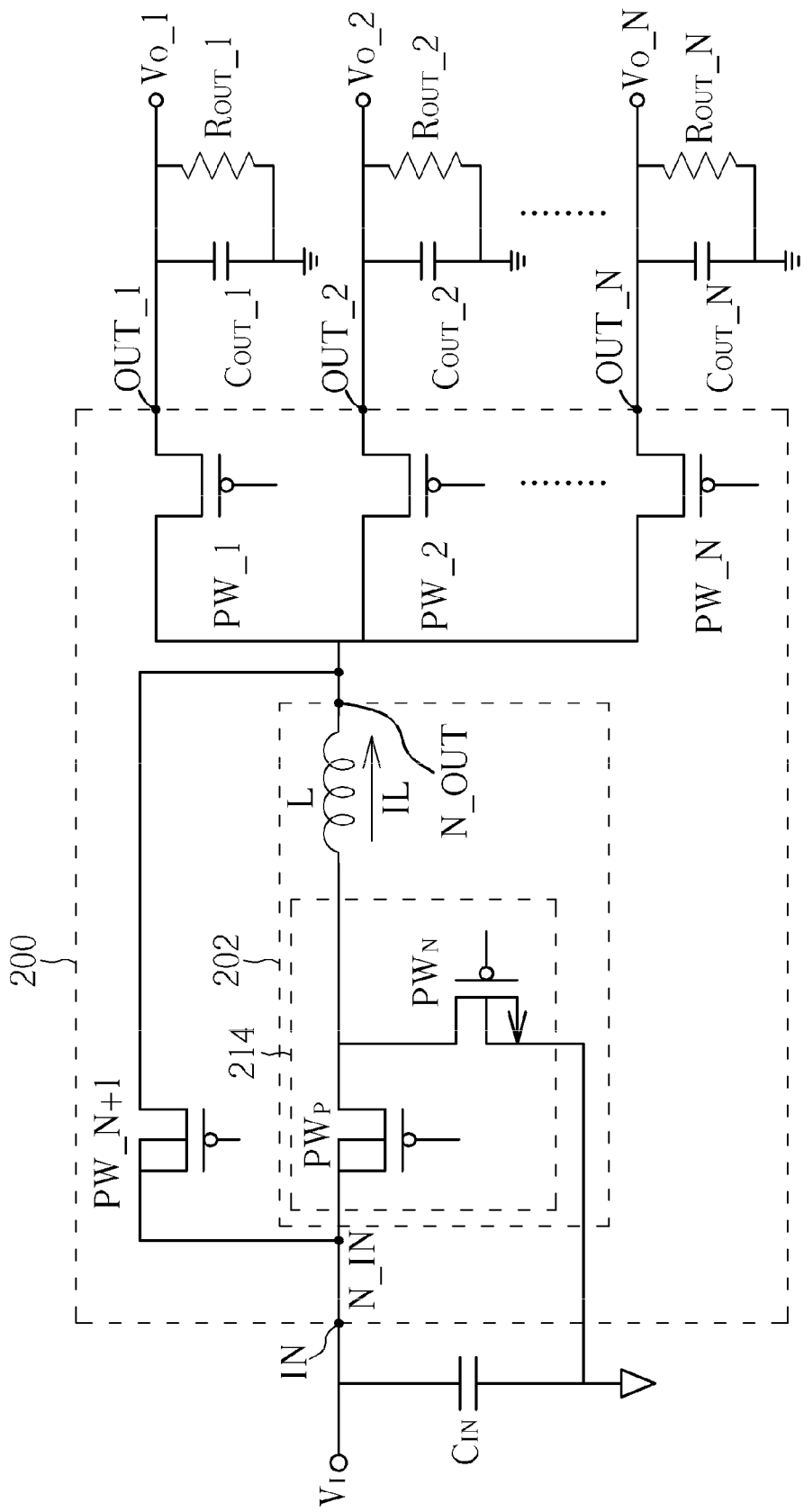
FIG. 2 is a first exemplary implementation of the DC-DC power supply block, the main output switches, and the auxiliary switch according to the present invention.

Please refer to FIG. 2, which is a first exemplary implementation of the DC-DC power supply block 102, the main output switches 104_1-104_N, and the auxiliary switch 104_N+1 according to the present invention. As shown in FIG. 2, the voltage converter 200 is based on the structure shown in FIG. 1. Specifically, the DC-DC power supply block 102 shown in FIG. 1 is implemented by the DC-DC power supply block 202, and the (N+1) switches, including the main output switches 104_1-104_N and the auxiliary switch 104_N+1 shown in FIG. 1, are implemented by active switches (e.g., transistors) PW_1, PW_2, . . . , PW_N+1, respectively. In this exemplary implementation, the DC-DC power supply block 202 includes an inductor L and a switch module 214 which has a first switch $PW_P$ and a second switch $PW_N$ included therein, where each of the first switch $PW_P$ and the second switch $PW_N$ is implemented by an active switch (e.g., a transistor). The inductor L is coupled to the output node N_OUT. The first switch $PW_P$ is coupled between the input node N_IN and the inductor L, and the second switch $PW_N$ is coupled between a signal ground and the inductor L.

By way of example, but not limitation, the voltage converter 200 may be a voltage converter chip with pins acting as the input terminal IN and output terminals OUT_1-OUT_N. As shown in FIG. 2, an input capacitor $C_{IN}$ is coupled to the input terminal IN, and a plurality of output capacitors $C_{OUT\_1}, C_{OUT\_2}, \ldots, C_{OUT\_N}$ are coupled to the output terminals OUT_1-OUT_N, respectively. Moreover, load devices represented by resistors $R_{OUT\_1}, R_{OUT\_2}, \ldots, R_{OUT\_N}$ are coupled to the output terminals OUT_1-OUT_N, respectively. In this exemplary implementation, the DC-DC power supply block 202 has a buck topology. Therefore, the first switch $PW_P$ is switched on and the second switch $PW_N$ is switched off when the switch module 214 has the first interconnection configuration, and the first switch $PW_P$ is switched off and the second switch $PW_N$ is switched on when the switch module 214 has the second interconnection configuration. As a person skilled in the art can readily understand the principle of the buck topology, further description is omitted here for brevity.

Figure 3:
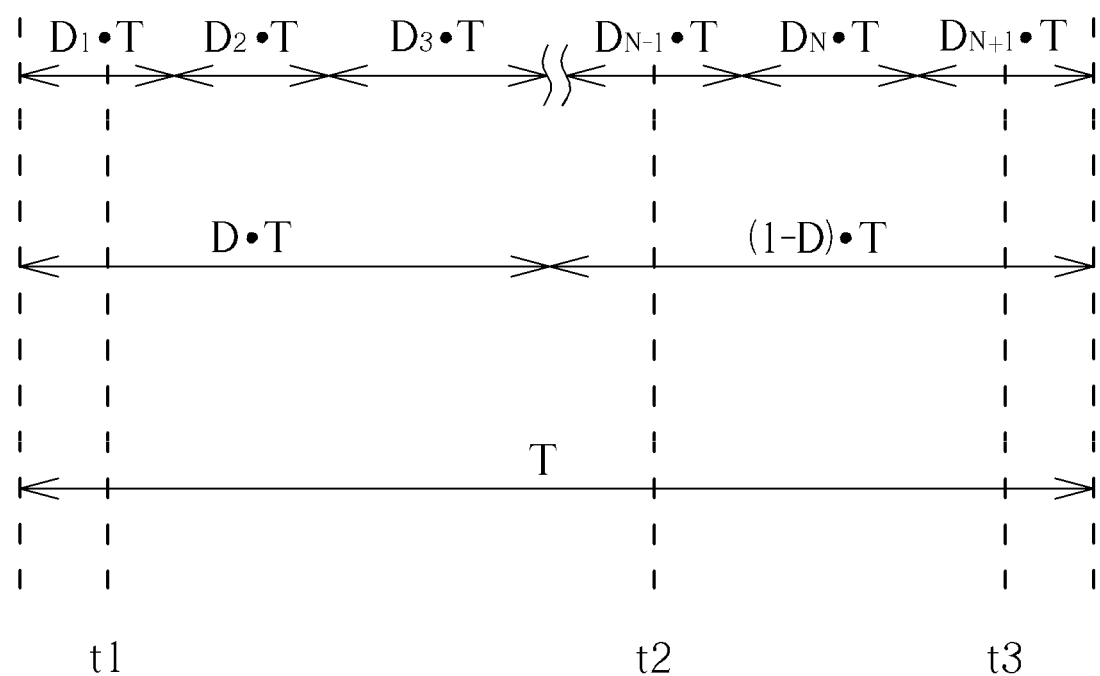
FIG. 3 is a diagram illustrating an exemplary sequence of switching on switches included in the voltage converter shown in FIG. 2.

During the predetermined time period in which the first switch $PW_P$ and the second switch $PW_N$ are switched on alternately, the output switches PW_1-PW_N+1 are turned on alternately. More specifically, the output switches PW_1-PW_N+1 are turned on one by one in a sequential order. Therefore, during the predetermined time period, the auxiliary switch PW_N+1 is turned on after all of the main output switches PW_1-PW_N are turned on alternately. Please refer to FIG. 3, which is a diagram illustrating an exemplary sequence of switching on switches included in the voltage converter 200. As shown in FIG. 3, the first switch $PW_P$ is given a duty cycle D, the second switch $PW_N$ is given a duty cycle (1-D), the main output switches PW_1-PW_N are given duty cycles $D_1, D_2, D_3, \ldots, D_{N-1}, D_N$, respectively, and the auxiliary switch PW_N+1 is given a duty cycle $D_{N+1}$. Please note that the duty cycle $D_{N+1}$ of the auxiliary switch PW_N+1 is directly set according to duty cycles $D_1$-$D_N$ of the main output switches PW_1-PW_N. In this embodiment, $D_{N+1}$ is set by following equation:

$$D_{N+1} = 1 - \sum_{i=1}^{N} D_i \quad (1)$$

That is, the setting of the duty cycle $D_{N+1}$ depends on settings of the duty cycles $D_1$-$D_N$ assigned to the main output switches PW_1-PW_N which will be alternately switched on before the auxiliary switch PW_N+1 is switched on. To put it another way, the duty cycles $D_1$-$D_N$ are properly adjusted for making the regulated output voltages $V_O\_$-$V_O\_N$ match the respective target voltage values required by the load devices (i.e., resistors $R_{OUT\_}1$-$R_{OUT\_}2$), whereas the setting of the duty cycle $D_{N+1}$ is irrelevant to regulating an output voltage due to the fact that the auxiliary switch PW_N+1 is coupled between the input terminal IN of the voltage converter 200 and the output node N_OUT of the DC-DC power supply block 102 and is not used for controlling an output voltage supplied to a load device. In the following, it will be explained that the duty cycle $D_{N+1}$ is passively adjusted in response to a change made to the inductor current IL flowing through the inductor L due to adjusting the duty cycle D of the first switch $PW_P$ as well as the duty cycle (1-D) of the second switch $PW_N$. Moreover, please be noted that FIG. 3 only shows an example of the present invention. In another embodiment, the sum of the switching-on periods $D_1*T, D_2*T, \ldots, D_{N+1}*T$ of the switches PW_1-PW_N+1 may be less than the time period T; or, the sum of the duty cycles $D_1$-$D_{N+1}$ may be less than one.

Figure 4:
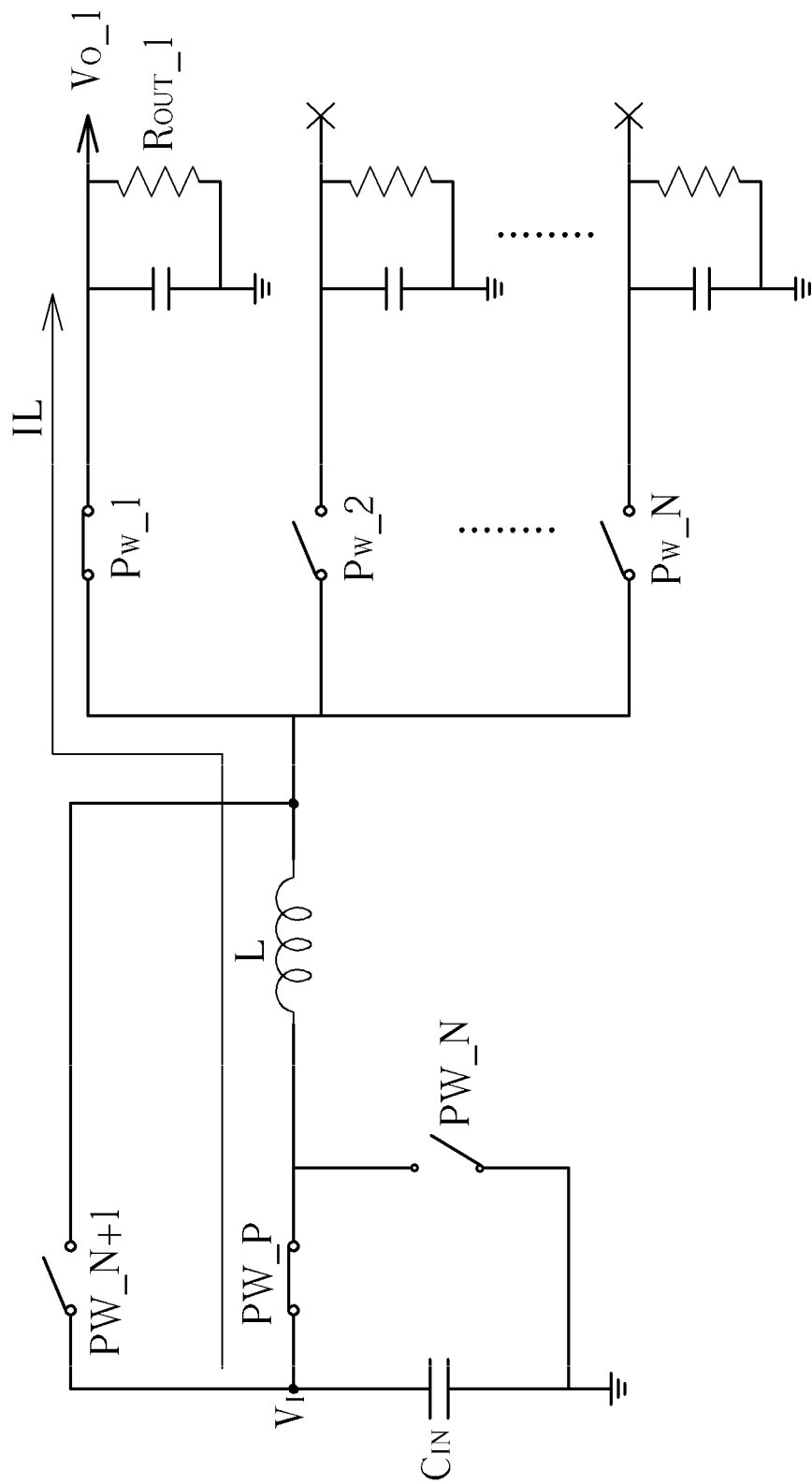
FIG. 4 is a diagram illustrating a first hardware status of the voltage converter operating at one phase.
Figure 5:
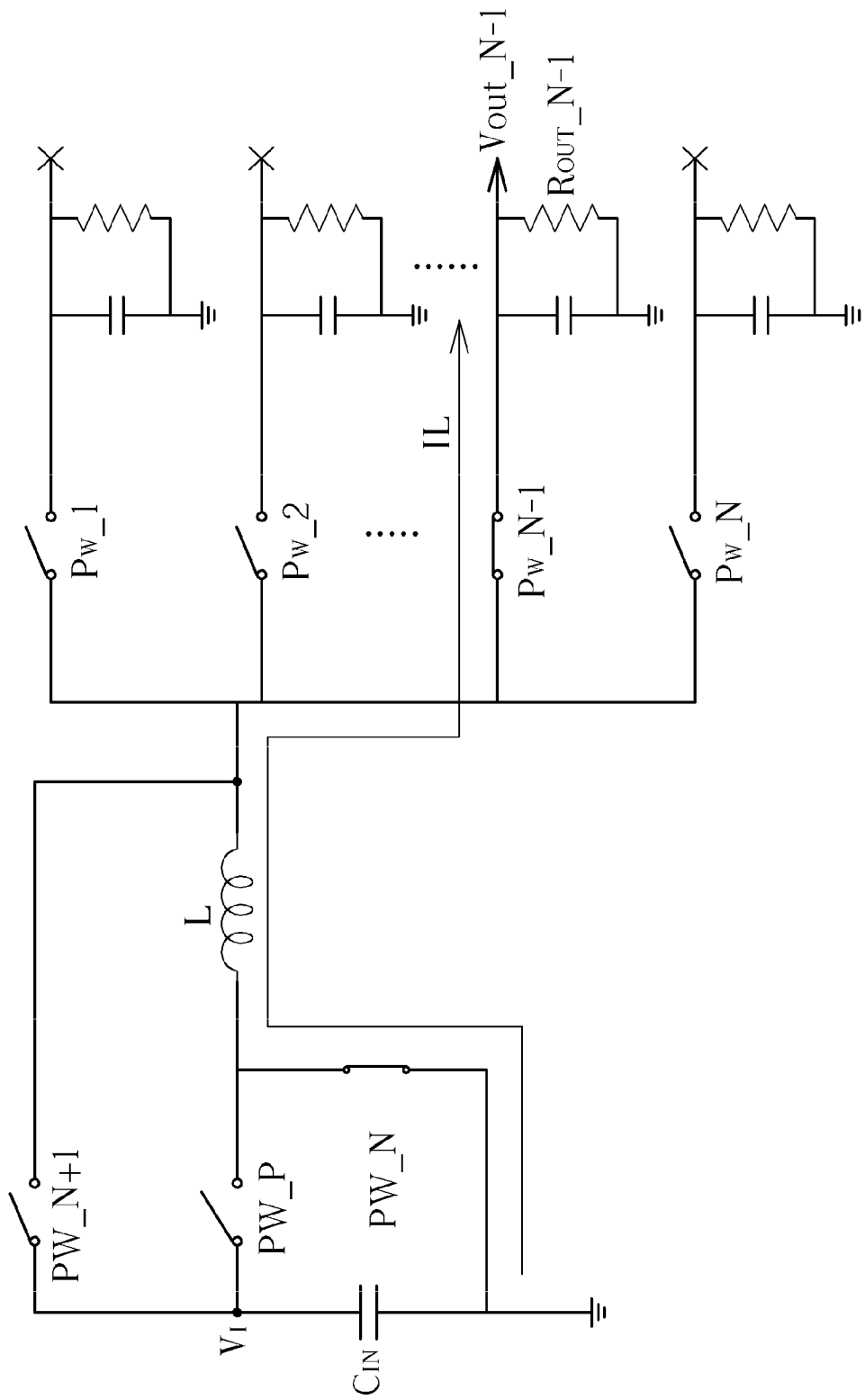
FIG. 5 is a diagram illustrating a second hardware status of the voltage converter operating at another phase.
Figure 6:
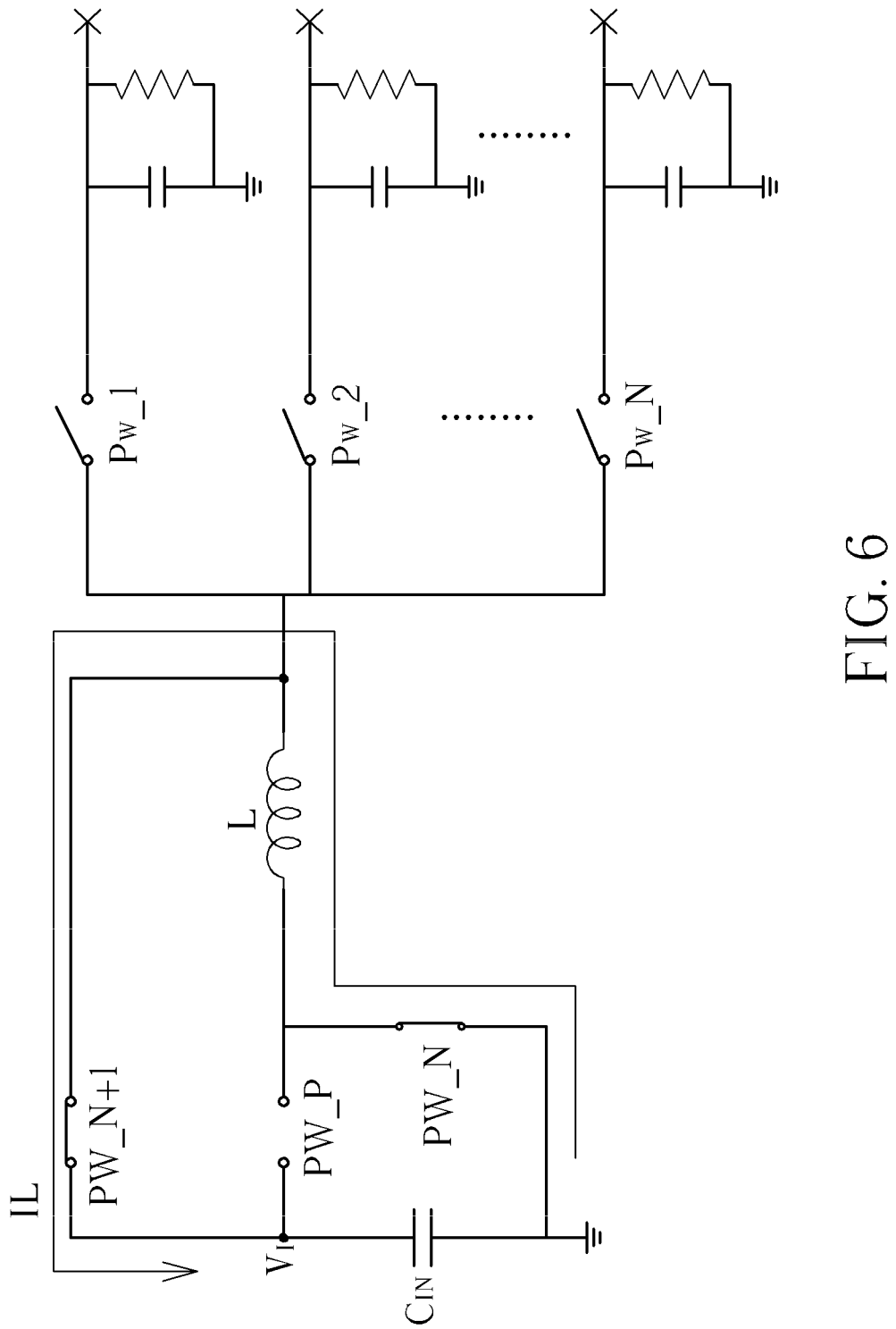
FIG. 6 is a diagram illustrating a third hardware status of the voltage converter operating at yet another phase.

For clarity, the hardware statuses of the voltage converter 200 at different phases are exemplarily shown in FIG. 4, FIG. 5, and FIG. 6. At time point t1 shown in FIG. 3, the voltage converter 200 stays in the first phase such that all of the (N+1) switches, except the main output switch PW_1, are switched off, the first switch $PW_P$ is switched on, and the second switch $PW_N$ is switched off. Thus, as shown in FIG. 4, the inductor current IL is delivered to the load device represented by the resistor $R_{OUT\_}1$, thereby forcing the regulated output voltage $V_O\_1$ to reach a target voltage value. At time point t2 shown in FIG. 3, the voltage converter 200 stays in the $(N-1)^{th}$ phase such that all of the (N+1) switches, except the main output switch PW_N-1, are switched off, the first switch $PW_P$ is switched off, and the second switch $PW_N$ is switched on. Thus, as shown in FIG. 5, the inductor current IL is delivered to the load device represented by the resistor $R_{OUT\_}N-1$, thereby forcing the regulated output voltage VOUT_N-1 to reach a target voltage value. At time point t3 shown in FIG. 3, the voltage converter 200 stays in the additional phase (i.e., the $(N+1)^{th}$ phase) such that all of the (N+1) switches, except the auxiliary switch PW_N+1, are switched off, the first switch $PW_P$ is switched off, and the second switch $PW_N$ is switched on. Thus, as shown in FIG. 6, the inductor current IL is delivered via a feedback path to a voltage source (not shown) which provides the reference input voltage $V_1$. As can be seen from FIG. 6, when the auxiliary switch PW_N+1 is switched on, the inductor current IL of the inductor L is fed back to the input terminal of the voltage converter 200. In other words, when the auxiliary switch PW_N+1 is switched on, the inductor current IL of the inductor L is not injected into any of the output terminals of the voltage converter 200.

Figure 7:
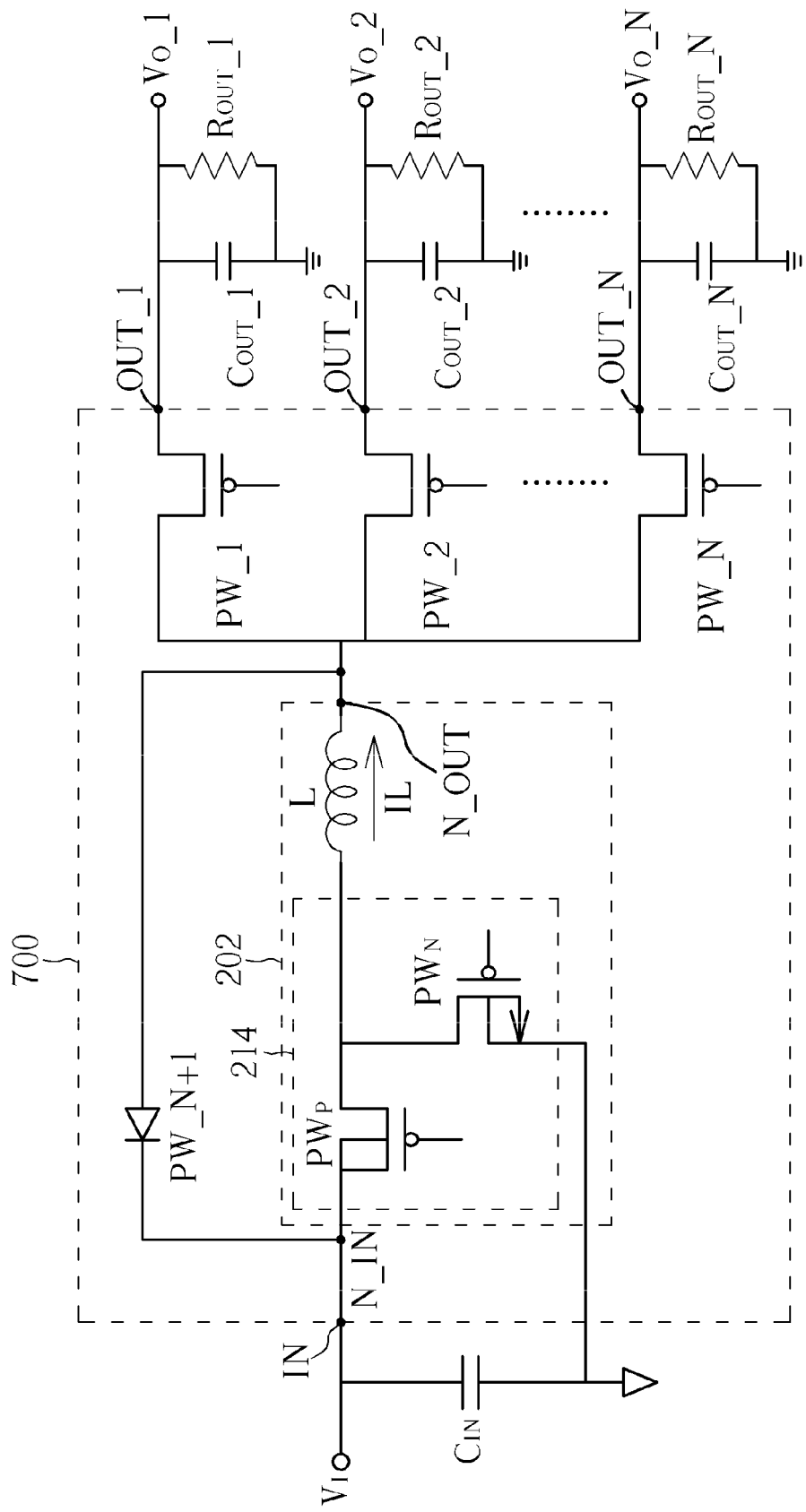
FIG. 7 is a second exemplary implementation of the DC-DC power supply block, the main output switches, and the auxiliary switch according to the present invention.
Figure 8:
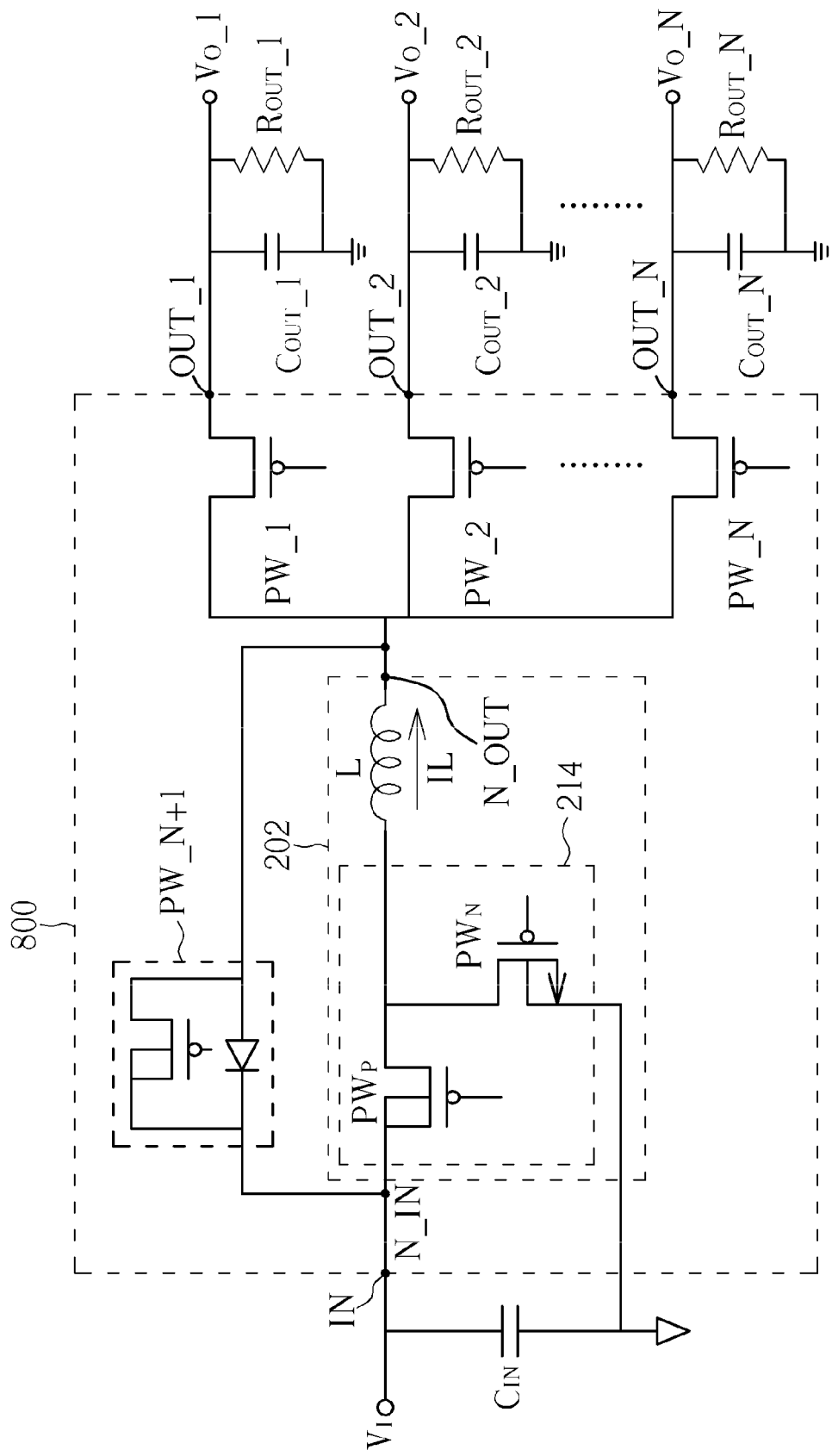
FIG. 8 is a third exemplary implementation of the DC-DC power supply block, the main output switches, and the auxiliary switch according to the present invention.

In above exemplary implementation shown in FIG. 2, the auxiliary switch 104_N+1 shown in FIG. 1 is implemented by an active switch (i.e., a transistor). However, this is for illustrative purposes only. Please refer to FIG. 7, which is a second exemplary implementation of the DC-DC power supply block 102, the main output switches 104_1-104_N, and the auxiliary switch 104_N+1 according to the present invention. The structure of the voltage converter 700 is similar to that of the voltage converter 200, and the major difference is that the auxiliary switch PW_N+1 is now implemented by a passive switch (e.g., a diode). Please refer to FIG. 8, which is a third exemplary implementation of the DC-DC power supply block 102, the main output switches 104_1-104_N, and the auxiliary switch 104_N+1 according to the present invention. The structure of the voltage converter 800 is similar to that of the voltage converter 200/700, and the major difference is that the auxiliary switch PW_N+1 is now implemented by a combination of one active switch (e.g., a transistor) and one passive switch (e.g., a diode). It should be noted that the same objective of establishing a discharging path/feedback path acting as a buffer between the input terminal IN and the output node N_OUT is achieved.

Please note that the main output switches PW_1-PW_N are implemented by transistors (also called pass transistors) which are controlled by an inner loop control scheme to determine how much power in one predetermined period T would be delivered to the load devices. However, regarding the first switch $PW_P$ and the second switch $PW_N$, they are controlled by an external loop control scheme to determine the average inductor current flowing through the inductor L in one predetermined period T. The details of the inner loop control scheme and the outer loop control scheme employed by the switch control circuit 106 shown in FIG. 1 are described as follows.

Figure 9:
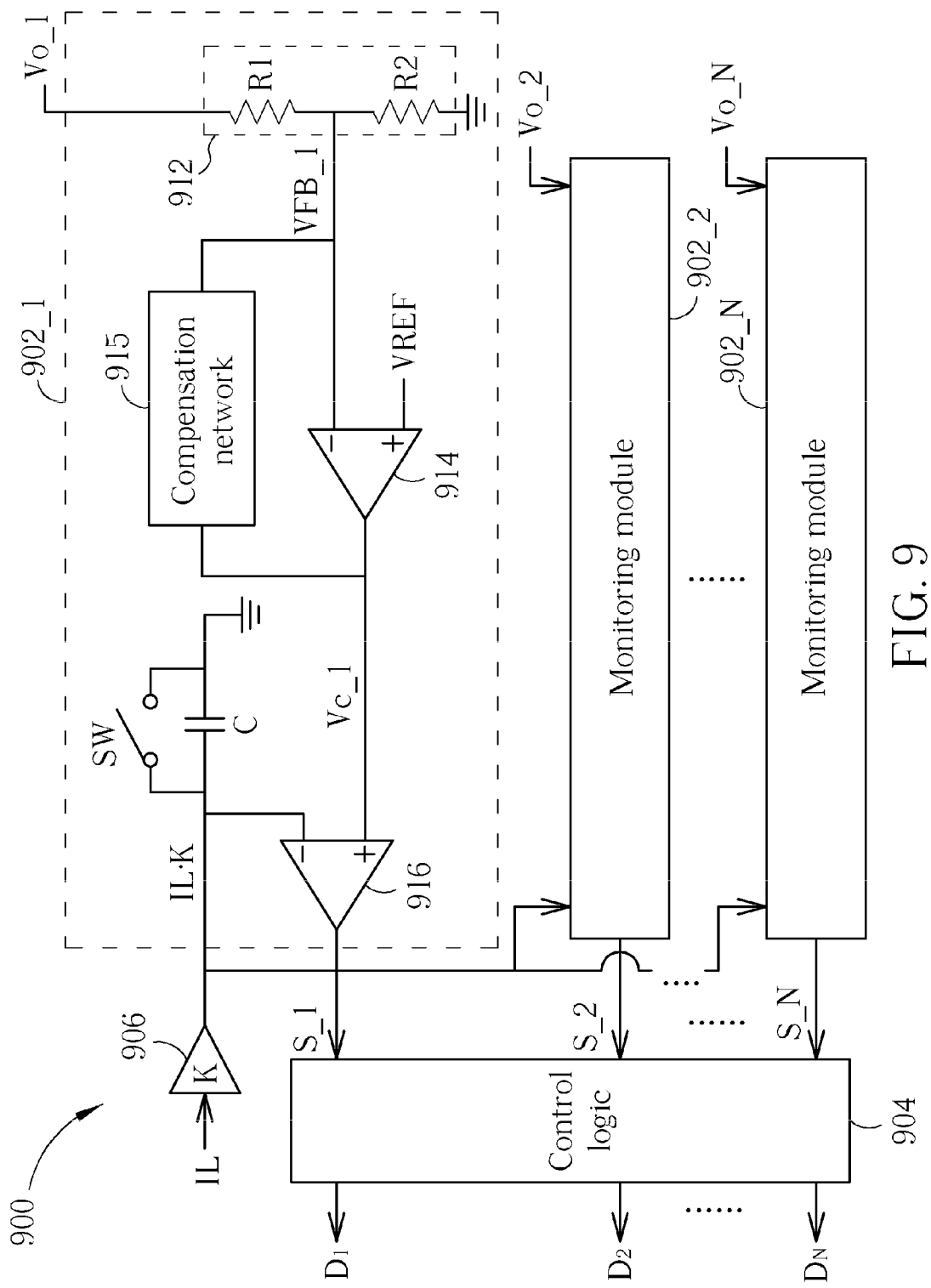
FIG. 9 is a diagram illustrating an inner loop control circuit implemented in the switch control circuit shown in FIG. 1.

Please refer to FIG. 9, which is a diagram illustrating an inner loop control circuit implemented in the switch control circuit 106 shown in FIG. 1. Please note that the inner loop control circuit 900 may be employed for controlling the duty cycles of the main output switches PW_1-PW_N shown in FIG. 2, FIG. 7, and FIG. 8. The inner loop control circuit 900 includes, but is not limited to, a plurality of monitoring modules 902_1-902_N each having the same hardware configuration and operational principle, a control logic 904, and a scaling unit 906. The monitoring modules 902_1-902_N receive the regulated output voltages $V_O\_1$-$V_O\_N$, and then generates a plurality of detecting results $S\_1, S\_2, \ldots, S\_N$, respectively. As the monitoring modules 902_1-902_N have the same hardware configuration and operational principle, only the monitoring module 902_1 is detailed for clarity and brevity. The monitoring module 902_1 includes, but is not limited to, a voltage divider 912 consisting of resistors R1 and R2, an error amplifier 914 with a compensation network 915, a comparator 916, a capacitor C, and a reset switch SW. A feedback voltage VFB_1 is generated from the voltage divider 912 according to the regulated output voltage $V_O\_1$, and then fed into the error amplifier 915. Next, a control voltage $V_{C\_1}$ is generated according to the difference between the feedback voltage VFB_1 and a reference voltage VREF, where resistance values of the resistors R1 and R2 and the voltage level of the reference voltage VREF should be properly set according to a target voltage value of the regulated output voltage $V_O\_1$. An inner loop control scheme employs a charge control theorem. The control voltage $V_{C\_1}$, which is an error amplifier output, depends on a load condition of the load device coupled to the output terminal OUT_1. With the supply of the correct average inductor current, the inner loop control inherently guarantees that the power required from the output terminal OUT_1 is transferred during the pass transistor (i.e., the main output switch PW_1) staying at the switch-on phase. The reset switch SW is used to reset the capacitor C when switched on. Please note that the on/off state of the reset switch SW is opposite to that of the pass transistor (i.e., the main output switch PW_1). That is, when the main output switch PW_1 is switched on, the reset switch SW is switched off, thereby allowing the scaled inductor current K*IL generated from the scaling unit 906 to charge the capacitor C. It should be noted that the scaling factor K is smaller than 1. The amount of charge stored in the capacitor C during the main output switch PW_1 staying in the switch-on phase is equal to $K*I_L*D_1*T$, where $I_L$ is the average inductor current. The control voltage $V_{C\_1}$ indicates how much power is delivered to the output terminal OUT_1 through the pass transistor (i.e., the main output switch PW_1). At a steady state, the relationship between the control voltage $V_{C\_1}$ and the average inductor current $I_L$ may be expressed as follows.

$$V_{C\_1} = \frac{I_L * K * D_1 * T}{C} \qquad (2)$$

The comparison result derived from comparing the actual control voltage $V_{C\_1}$ and the expected control voltage $(K*I_L*D_1*T)/C$ acts as the detecting result S_1 transmitted to the control logic 904. Next, the control logic 904 increases, decreases, or maintains the duty cycle $D_1$ by referring to the detecting result S_1. For example, when the detecting result S_1 indicates that the actual control voltage $V_{C\_1}$ is higher than the expected control voltage $(K*I_L*D_1*T)/C$, implying that the regulated output voltage $V_O\_1$ is lower than its target voltage value, the control logic 904 therefore increases the duty cycle $D_1$. When the detecting result S_1 indicates that the actual control voltage $V_{C\_1}$ is lower than the expected control voltage $(K*I_L*D_1*T)/C$, implying that the regulated output voltage $V_O\_1$ is higher than its target voltage value, the control logic 904 therefore decreases the duty cycle $D_1$. When the detecting result S_1 indicates that the actual control voltage $V_{C\_1}$ is equal to the expected control voltage $(K*I_L*D_1*T)/C$, implying that the regulated output voltage $V_O\_1$ is equal to its target voltage value, the control logic 904 therefore keeps the duty cycle $D_1$ intact.

Regarding the monitoring modules 902_1-902_N, the relationship between the control voltages $V_{C\_2}$-$V_{C\_N}$ and the average inductor current $I_L$ may be expressed by following equations.

$$V_{C\_2} = \frac{I_L * K * D_2 * T}{C} \qquad (3)$$
$$\vdots$$
$$V_{C\_N} = \frac{I_L * K * D_N * T}{C}$$

The additional phase introduced by the implemented auxiliary switch PW_N+1 guarantees that previous phases have enough margins to properly regulate the output voltages at the output terminals OUT_1-OUT_N, and all duty cycles $D_1$-$D_N$ of the main output switches PW_1-PW_N are well controlled even though a load transient on any of the converter outputs affects the regulation of the other converter outputs. To put it simply, with the help of the auxiliary switch PW_N+1 which provides an additional phase and acts as a buffer, the control logic 904 is allowed to directly adjust the duty cycles $D_1$-$D_N$ for making the regulated output voltages $V_O\_1$-$V_O\_N$ correctly tuned to respective target voltage values. The undesired effect resulted from cross regulation is avoided as all of the output voltages are now allowed to be properly and correctly regulated.

An external control loop ensures that the average current requests from different load devices would be satisfied at the steady state. Please refer to FIG. 10, which is a diagram illustrating an outer loop control circuit implemented in the switch control circuit 106 shown in FIG. 1. Please note that the outer loop control circuit 1000 may be employed for controlling duty cycles of the first switch $PW_P$ and the second switch $PW_N$ shown in FIG. 2, FIG. 7, and FIG. 8. The outer loop control circuit 1000 includes, but is not limited to, the aforementioned scaling unit 906 and control logic 904, a plurality of combining units 1002, 1004, an error amplifier 1006, a comparator 1008, a plurality of voltage-to-current (V2I) converting units 1010_1, 1010_2, . . . , 1010_N, 1010_N+1, and a resistor R. The error amplifier 1006 is implemented for comparing the duty cycle $D_{N+1}$ and a predetermined duty cycle $D_{REF}$, and accordingly generating a comparison result (i.e., an error amplifier output) as an additional control voltage $V_{C\_N+1}$. Specifically, the error amplifier 1006 generates the control voltage $V_{C\_N+1}$ according to the auxiliary switch's control signal with the duty cycle $D_{N+1}$ and a reference oscillating signal with the predetermined duty cycle $D_{REF}$ (e.g., 10%).

Please note that the control voltages $V_{C\_1}$-$V_{C\_N}$ generated by the monitoring modules 902_1-902_N are also transmitted to the voltage-to-current converting units 1010_1-1010_N, respectively. The combining unit 1004 combines the scaled inductor current IL*K with currents corresponding to the control voltages $V_{C\_1}$-$V_{C\_N+1}$, and then a resultant current generated from the combining unit 1004 is converted into a control voltage $V_C$ through the resistor R. In a steady state, the relationship between the control voltages $V_{C\_1}$-$V_{C\_N+1}$ and the average inductor current $I_L$ can be expressed by following equation.

$$\frac{1}{N+1} * \sum_{i=1}^{N+1} V_{C\_i} * \frac{1}{R} = \qquad (4)$$

$$\frac{1}{N+1} * \left[ I_L * K * T * \frac{1}{C} * \sum_{i=1}^{N} D_i + V_{C\_N+1} \right] * \frac{1}{R} = K * I_L$$

With a proper design of R and C, the control voltage $V_{C\_N+1}$ at a steady state would satisfy the equation (4). For example, the R and C may be configured according to the following equation.

$$R*C = \frac{1}{N+1} *T \qquad (5)$$

In view of above, the control voltage $V_{C\_N+1}$ at a steady state can be expressed as follows.

$$V_{C\_1} = I_L * K * \left(1 - \sum_{i=1}^{N} D_i\right) * T * \frac{1}{C} = I_L * K * D_{N+1} * T * \frac{1}{C} \qquad (6)$$

It expresses that this control voltage $V_{C\_N+1}$ is also proportional to the inductor current passing through the auxiliary switch PW_N+1 and then injected into the input terminal to which a voltage source is coupled. The charge control theorem is still followed. It should be noted that the relationship between the control voltage $V_{C\_N+1}$ and the average inductor current $I_L$ is correct at the steady state instead of the transient response. If a load transient occurs on any of the output terminals, the amount of charge delivered through the main output switches PW_1-PW_N can be determined independently. In regard to the auxiliary switch PW_N+1, the introduced phase mainly kicks the inductor current back to the input terminal. Therefore, there is no cross regulation issue on any output voltage of the exemplary voltage converter of the present invention.

The average inductor current $I_L$ is a function of the duty cycle D of the first switch $PW_P$. Thus, there are (N+1) variables (i.e., the duty cycles $D_1$-$D_N$ of the main output switches PW_1-PW_N and the duty cycle D of the first switch $PW_P$) in above-mentioned control scheme. As shown in aforementioned equations (2) and (3), there are N equations employed in the inner loop control scheme. Besides, as shown in the aforementioned equation (4), there is one equation employed in the outer loop control scheme. As the number of variables is equal to the number of equations, only one steady-state solution exists. Thus, the control scheme employed by the switch control circuit 106 would be stable.

Figure 10:
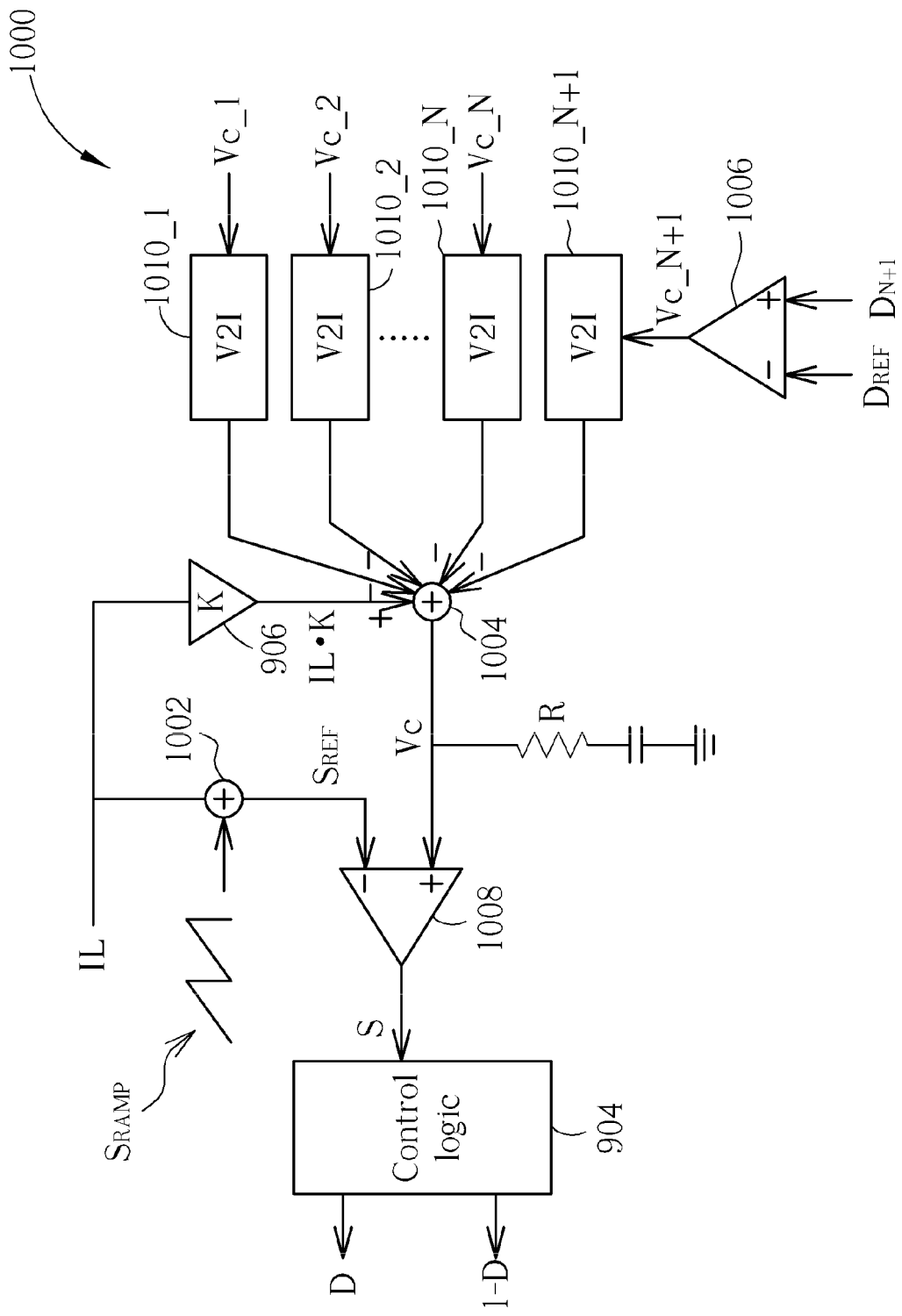
FIG. 10 is a diagram illustrating an outer loop control circuit implemented in the switch control circuit shown in FIG. 1.

As shown in FIG. 10, the combining unit 1002 generates a reference signal $S_{REF}$ by combining a ramp signal $S_{RAMP}$ and the inductor current IL. Next, the comparator 1008 generates a detecting result S by comparing the control voltage $V_C$ with the reference signal $S_{REF}$. For example, when the detecting result S indicates that the control voltage $V_C$ is higher than a voltage level of the reference signal $S_{REF}$, this implies that the average inductor current $I_L$ may be too small. Thus, by referring to the detecting result S, the control logic 904 increases the duty cycle D of the first switch $PW_P$ and accordingly decreases the duty cycle (1-D) of the second switch $PW_N$. When the detecting result S indicates that the control voltage $V_C$ is lower than a voltage level of the reference signal $S_{REF}$, this implies that the average inductor current $I_L$ may be too large. Thus, by referring to the detecting result S, the control logic 904 decreases the duty cycle D of the first switch $PW_P$ and accordingly increases the duty cycle (1-D) of the second switch $PW_N$. When the detecting result S indicates that the control voltage $V_C$ is equal to a voltage level of the reference signal $S_{REF}$, this implies that the average inductor current $I_L$ satisfies the requirement. Thus, by referring to the detecting result S, the control logic 904 does not need to change the current settings of the duty cycle D of the first switch $PW_P$ and the duty cycle (1-D) of the second switch $PW_N$.

By way of example, but not limitation, the predetermined duty cycle $D_{REF}$ may be set by a specific percentage vale P (e.g., P=10%). In one embodiment, the sum of the non-overlapped duty cycles $D_1$-$D_N$ would be one minus P (e.g., 1–P=90%), ideally. In a case where the current duty cycle $D_{N+1}$ of the auxiliary switch PW_N+1 is smaller than the predetermined duty cycle $D_{REF}$, this implies that the average inductor current $I_L$ should be increased to reduce the current sum of the non-overlapped duty cycles $D_1$-$D_N$. Thus, the control voltage $V_{C\_N+1}$ would make the control voltage $V_C$ increased. In another case where the current duty cycle $D_{N+1}$ of the auxiliary switch PW_N+1 is larger than the predetermined duty cycle $D_{REF}$, this implies that the current sum of the non-overlapped duty cycles $D_1$-$D_N$ should be decreased. Thus, the control voltage $V_{C\_N+1}$ would make the control voltage $V_C$ decreased.

Figure 11:
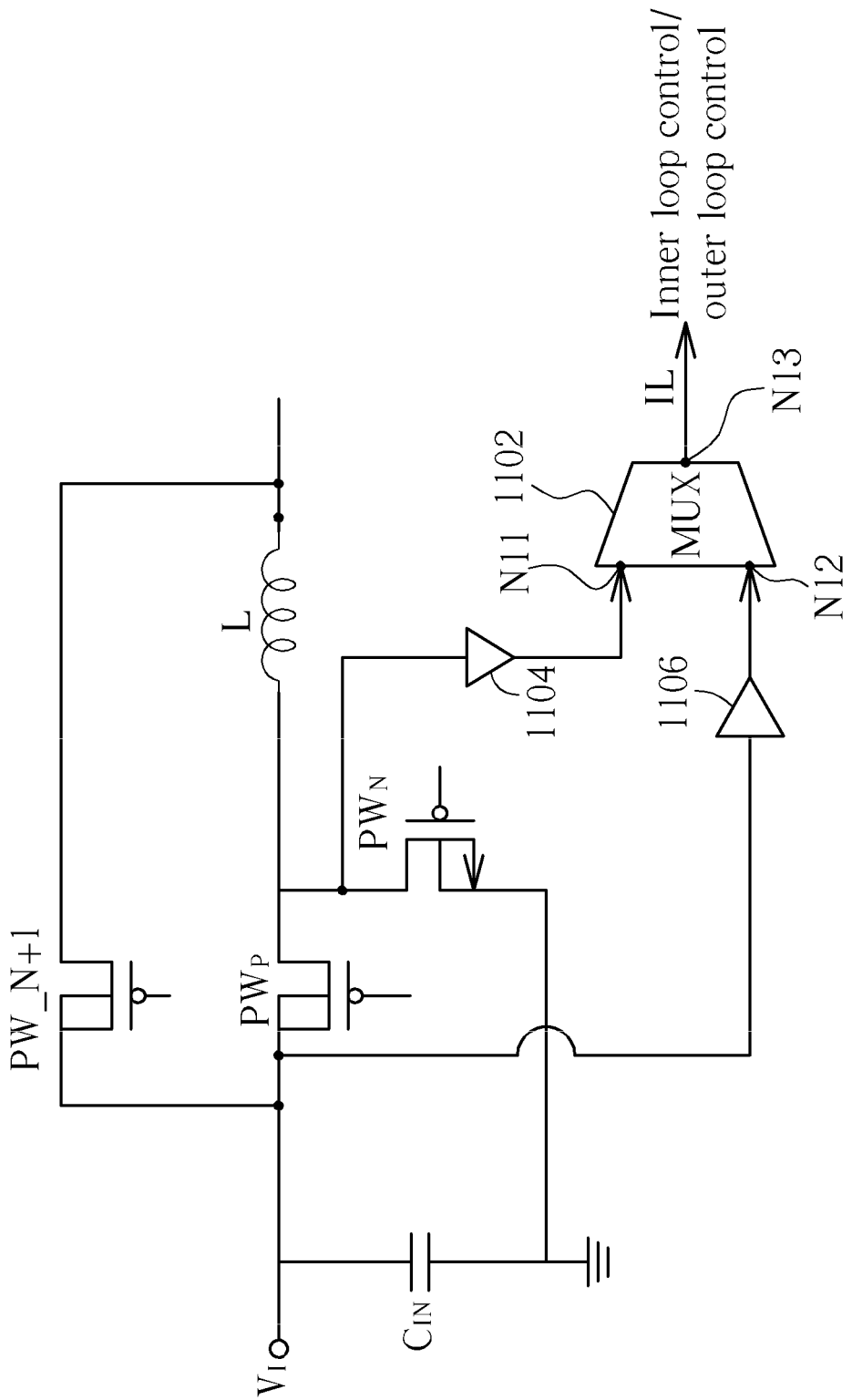
FIG. 11 is a diagram illustrating the use of a multiplexer for providing the inductor current to the inner loop control circuit shown in FIG. 9 and the outer loop control circuit shown in FIG. 10.

As shown in FIG. 9 and FIG. 10, the inductor current IL is required by either of the inner loop control circuit 900 and the outer loop control circuit 1000. As the first switch $PW_P$ and the second switch $PW_N$ are switched on alternately (i.e., the first switch $PW_P$ and the second switch $PW_N$ are not switched on simultaneously), a multiplexer may be employed for properly providing the inductor current to the switch control circuit 106 having the aforementioned inner loop control scheme and outer loop control scheme employed therein. Please refer to FIG. 11, which is a diagram illustrating the use of a multiplexer for providing the inductor current IL to the inner loop control circuit 900 shown in FIG. 9 and the outer loop control circuit 1000 shown in FIG. 10. As shown in the figure, the multiplexer (MUX) 1102 has a first input node N11, a second input node N12, and an output node N13. When the first switch $PW_P$ is switched on, the multiplexer 1102 is configured to output the inductor current IL according the incoming current received at the second input node N12. When the second switch $PW_N$ is switch on, the multiplexer 1102 is configured to output the inductor current IL according the incoming current received at the first input node N11. Please note that buffers 1104 and 1106 may be employed to adjust magnitude of the current fed into the multiplexer 1102. However, the buffers 1104 and 1106 may be optional, depending upon actual design consideration.

In above exemplary implementations, the DC-DC power supply block 102 in the voltage converter 100 shown in FIG. 1 is realized using a buck topology. However, this is for illustrative purposes only, and is not meant to be a limitation of the present invention. For example, in an alternative design, the same conception of the present invention may be applied to a boost converter (i.e., the DC-DC power supply block 102 may be realized by a boost topology). Moreover, in an alternative design, the second end N2 of the auxiliary switch 104_N+1 may be coupled to an internal dummy load instead of the input terminal IN of the voltage converter 200. The same objective of introducing an additional phase during the predetermined time period for allowing duty cycles of the main output switches to be well controlled is achieved.

In accordance an exemplary embodiment of the present invention, the voltage converting method may be briefly summarized as below. The voltage converting method may include providing a voltage converter for receiving a reference input voltage and outputting only N regulated output voltages, wherein the voltage converter includes a DC-DC power supply block and has N output phases. The DC-DC power supply block has an input node and an output node, and includes: an inductor configured for storing energy through the input node coupled to the input terminal and discharging the stored energy through the output node, and a switch module coupled to the inductor and configured for alternating between at least a first interconnection configuration and a second interconnection configuration during a predetermined time period. Each of the N output phases provides a regulated output voltage from the output node, where N is a positive integer. The voltage converting method may further include providing an auxiliary phase not providing any regulated output voltage, and during the predetermined time period, switching on the N output phases and the auxiliary phase alternately. It should be noted that the voltage converting method may implement the auxiliary phase by an auxiliary switch, where the auxiliary switch may be implemented by at least one of a transistor and a diode, and/or implement the DC-DC power supply block by a buck topology.

In one exemplary implementation, the voltage converting method may further include injecting the inductor current back to the input terminal of the voltage converter during the auxiliary phase. For example, output node of the DC-DC power supply block is coupled to the input terminal during the auxiliary phase. In yet another exemplary implementation, during the auxiliary phase, an inductor current of the inductor is not injected into any output terminals of the voltage converter.

Moreover, the voltage converting method may further include controlling non-overlapped duty cycles of the N output phases according to control voltages derived from the N regulated output voltages, directly setting a duty cycle of the auxiliary phase according to duty cycles of the N main output phases, and/or controlling a duty cycle of a first switch included in the switch module by comparing the duty cycle of the auxiliary switch with a predetermined duty cycle and accordingly generating a comparison result, and controlling the duty cycle of the first switch during the predetermined time period according to the N regulated output voltages, the comparison result, and the inductor current of the inductor.

As a person skilled in the art can readily understand details of each step included in the voltage converting method after reading above paragraphs directed to the voltage converter, further description is omitted here for brevity.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A voltage converter having an input terminal for receiving a reference input voltage and only N output terminals for outputting regulated output voltages, the voltage converter comprising:
    a DC-DC power supply block, having an input node and an output node, wherein the DC-DC power supply block comprises:
        an inductor; and
        a switch module, coupled to the inductor and arranged for alternating between a first interconnection configuration and a second interconnection configuration, wherein the switch module has a first switch and a second switch, the switch module has the first interconnection configuration when the first switch is switched on and the second switch is switched off, the switch module has the second interconnection configuration when the first switch is switched off and the second switch is switched on, a sum of an active period of the first interconnection configuration and an active period of the second interconnection configuration is a predetermined time period, and during the predetermined time period, the first switch is switched on only once and the second switch is switched on only once;
    and
    (N+1) switches, including N main output switches and an auxiliary switch each having a first end and a second end, wherein first ends of the (N+1) switches are coupled to the output node, and second ends of the N main output switches are coupled to the N output terminals, respectively, where N is a positive integer;
    wherein the (N+1) switches are switched on alternately during each of a plurality of successive predetermined time periods; the predetermined time period associated to the first switch and the second switch of the switch module is said each of the plurality of successive predetermined time periods associated to the (N+1) switches; each of the (N+1) switches is configured to switch between an ON state and an OFF state within a same predetermined time period common to all of the (N+1) switches; each of the first switch and the second switch is configured to switch between an ON state and an OFF state within the same predetermined time period also common to all of the first switch and the second switch; and the same predetermined time period is said each of the plurality of successive predetermined time periods.

2. The voltage converter of claim 1, wherein a second end of the auxiliary switch is coupled to the input terminal.

3. The voltage converter of claim 1, wherein when the auxiliary switch is switched on, an inductor current of the DC-DC power supply block is fed back to the input terminal.

4. The voltage converter of claim 1, wherein when the auxiliary switch is switched on, an inductor current of the DC-DC power supply block is not injected into any of the N output terminals.

5. The voltage converter of claim 1, wherein the N main output switches have non-overlapped duty cycles during the predetermined time period, respectively, and the switch control circuit controls the non-overlapped duty cycles of the N output switches according to control voltages derived from the regulated output voltages at the N output terminals.

6. The voltage converter of claim 1, wherein the auxiliary switch comprises at least one of a transistor and a diode.

7. The voltage converter of claim 1, wherein the DC-DC power supply block has a buck topology.

8. The voltage converter of claim 1, wherein the (N+1) switches have non-overlapped duty cycles during the predetermined time period, respectively, and the switch control circuit directly sets a duty cycle of the auxiliary switch according to duty cycles of the N main output switches.

9. The voltage converter of claim 8, wherein the duty cycle of the auxiliary switch is directly set by a following equation:

$$D_{N+1} = 1 - \sum_{i=1}^{N} D_i,$$

wherein $D_{N+1}$ and $$\sum_{i=1}^{N} D_i$$

represent the duty cycle of the auxiliary switch and a sum of the duty cycles of the N main switches during the same predetermined time period, respectively; and the duty cycle of the auxiliary switch is set after the duty cycles of the N main switches are determined.

10. The voltage converter of claim 1, wherein during the predetermined time period, the switch control circuit switches on the auxiliary switch after alternately switching on the N main output switches.

11. The voltage converter of claim 1, wherein the inductor is configured for storing energy through the input node coupled to the input terminal and discharging the stored energy through the output node.

12. The voltage converter of claim 11, wherein the switch control circuit controls a duty cycle of the first switch during the predetermined time period according to the regulated output voltages at the N output terminals, a duty cycle of the auxiliary switch, and an inductor current of the inductor.

13. The voltage converter of claim 12, wherein the switch control circuit compares the duty cycle of the auxiliary switch with a predetermined duty cycle and accordingly generates a comparison result, and controls the duty cycle of the first switch during the predetermined time period according to the regulated output voltages at the N output terminals, the comparison result, and the inductor current of the inductor.

14. The voltage converter of claim 11, wherein the inductor is coupled to the output node, the first switch is coupled between the input node and the inductor, and the second switch is coupled between a signal ground and the inductor.

15. A voltage converting method, comprising:
providing a voltage converter for receiving a reference input voltage and outputting N regulated output voltages, wherein the voltage converter comprises N output phases and an auxiliary phase, each of the N output phases provides a regulated output voltage, respectively, where N is a positive integer, and the auxiliary phase is not for providing a regulated output voltage; the reference input voltage is coupled to an inductor via a switch module, where the switch module alternates between a first interconnection configuration and a second interconnection configuration, the switch module has a first switch and a second switch, the switch module has the first interconnection configuration when the first switch is switched on and the second switch is switched off, the switch module has the second interconnection configuration when the first switch is switched off and the second switch is switched on, a sum of an active period of the first interconnection configuration and an active period of the second interconnection configuration is a predetermined time period and during the predetermined time period, the first switch is switched on only once and the second switch is switched on only once; and
during each of a plurality of successive predetermined time periods, switching on the N output phases and the auxiliary phase alternately;
wherein the predetermined time period associated to the first switch and the second switch of the switch module is said each of the plurality of successive predetermined time periods associated to the N output phases and the auxiliary phase; each of the N output phases and the auxiliary phase is controlled to switch between an ON state and an OFF state within a same predetermined time period common to all of the N output phases and the auxiliary phase; each of the first switch and the second switch is configured to switch between an ON state and an OFF state within the same predetermined time period also common to all of the first switch and the second switch; and the same predetermined time period is said each of the plurality of successive predetermined time periods.

16. The voltage converting method of claim 15, wherein during the auxiliary phase, an inductor current of the voltage converter is fed back to an input terminal of the voltage converter.

17. The voltage converting method of claim 15, wherein during the auxiliary phase, an inductor current of the voltage converter is not contributed to the N regulated output voltages.

18. The voltage converting method of claim 15, wherein the N output phases have non-overlapped duty cycles during the predetermined time period, respectively, and the voltage converting method further comprises:
controlling the non-overlapped duty cycles of the N output phases according to control voltages derived from the N regulated output voltages.

19. The voltage converting method of claim 15, wherein the N output phases and the auxiliary phase have non-overlapped duty cycles during the predetermined time period, respectively, and the voltage converting method further comprises:
directly setting a duty cycle of the auxiliary phase according to duty cycles of the N output phases.

20. The voltage converting method of claim 19, wherein the duty cycle of the auxiliary phase is directly set by a following equation:

$$D_{N+1} = 1 - \sum_{i=1}^{N} D_i,$$

wherein $D_{N+1}$ and $$\sum_{i=1}^{N} D_i$$

represent the duty cycle of the auxiliary phase and a sum of the duty cycles of the N output phases during the same predetermined time period, respectively; and the duty cycle of the auxiliary phase is set after the duty cycles of the N output phases are determined.

21. The voltage converting method of claim 15, wherein switching on the N output phases and the auxiliary phase alternately comprises:
switching on the auxiliary phase after alternately switching on the N output phases.

22. The voltage converting method of claim 15, wherein the voltage converting method further comprises:
controlling a duty cycle of the first switch during the predetermined time period according to the N regulated output voltages, a duty cycle of the auxiliary phase, and an inductor current of the voltage converter.

23. The voltage converting method of claim 22, wherein controlling the duty cycle of the first switch during the predetermined time period comprises:
comparing the duty cycle of the auxiliary phase with a predetermined duty cycle and accordingly generating a comparison result; and
controlling the duty cycle of the first switch during the predetermined time period according to the N regulated output voltages, the comparison result, and the inductor current of the voltage converter.

24. The voltage converting method of claim 15, wherein providing the voltage converter comprises:
   implementing the voltage converter by a buck topology.

* * * * *